(12) United States Patent
Focchi et al.

(10) Patent No.: US 8,957,540 B2
(45) Date of Patent: Feb. 17, 2015

(54) DEVICE FOR GENERATING ELECTRIC POWER FROM A SOURCE OF AIR OR OTHER GAS OR FLUID UNDER PRESSURE

(75) Inventors: Michele Focchi, Rimini (IT); Emanuele Guglielmino, Genoa (IT); Gianluca Pane, Ivrea (IT); Stefano Cordasco, Genoa (IT); Carlo Tacchino, Genoa (IT); Darwin G. Caldwell, Serra Ricco' (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 99 days.

(21) Appl. No.: 13/808,235

(22) PCT Filed: Jul. 5, 2011

(86) PCT No.: PCT/IB2011/052965
§ 371 (c)(1),
(2), (4) Date: Jan. 3, 2013

(87) PCT Pub. No.: WO2012/004738
PCT Pub. Date: Jan. 12, 2012

(65) Prior Publication Data
US 2013/0099501 A1 Apr. 25, 2013

(30) Foreign Application Priority Data
Jul. 6, 2010 (IT) .............................. TO2010A0578

(51) Int. Cl.
*H02K 16/02* (2006.01)
*H02K 7/18* (2006.01)
(Continued)

(52) U.S. Cl.
CPC ................ *H02K 7/1823* (2013.01); *F03B 3/04* (2013.01); *F03B 13/00* (2013.01); *F03D 9/00* (2013.01); *F05B 2220/60* (2013.01); *F05B 2220/7068* (2013.01); *F05B 2280/2006* (2013.01); *F05B 2280/6003* (2013.01); *F05C 2203/0882* (2013.01); *F05C 2253/04* (2013.01);
(Continued)

(58) Field of Classification Search
USPC ................................................ 290/52, 43, 54
See application file for complete search history.

(56) References Cited

U.S. PATENT DOCUMENTS 6,511,201 B1    1/2003  Elrod
7,980,143 B2 *  7/2011  Peleg .......................... 73/861.78
(Continued)

FOREIGN PATENT DOCUMENTS

WO       WO 00/17524 A1    3/2000

OTHER PUBLICATIONS

International Search Report for corresponding International Patent Application No. PCT/IB2011/052965 mailed Oct. 7, 2011.

*Primary Examiner* — Tho D Ta
(74) *Attorney, Agent, or Firm* — Merchant & Gould P.C.

(57) ABSTRACT

A device (10) includes a turbine (22, 34) having an impeller (22), and an electric generator (12, 24) having a stator (12) provided with stator windings distributed around a cylindrical surface (X) coaxial to the impeller (22), and a permanent magnet (24) which is rotatable relative to the stator (12) and is drivingly connected for rotation with the impeller (22). The impeller (22) is housed inside the permanent magnet (24) and the assembly formed by the impeller (22) and by the permanent magnet (24) is housed inside the stator (12). The permanent magnet (24) is made as a single hollow cylindrical body of high magnetic density material with diametrical magnetization.

8 Claims, 2 Drawing Sheets

(51) Int. Cl.
*F03B 3/04* (2006.01)
*F03B 13/00* (2006.01)
*F03D 9/00* (2006.01)

(52) U.S. Cl.
CPC ............... *Y02B 10/50* (2013.01); *Y02E 10/223* (2013.01); *Y02E 10/725* (2013.01)
USPC .......................................................... 290/52

(56) References Cited

U.S. PATENT DOCUMENTS

2005/0258694 A1 11/2005 Leininger
2009/0224544 A1 9/2009 Bartlett

\* cited by examiner

DEVICE FOR GENERATING ELECTRIC POWER FROM A SOURCE OF AIR OR OTHER GAS OR FLUID UNDER PRESSURE

This application is a National Stage Application of PCT/IB2011/052965, filed 5 Jul. 2011, which claims benefit of Ser. No. TO2010A000578, filed 6 Jul. 2010 in Italy and which applications are incorporated herein by reference. To the extent appropriate, a claim of priority is made to each of the above disclosed applications.

BACKGROUND OF THE INVENTION

The present invention relates to a device for generating electric power from a source of air or other gas or fluid under pressure.

Devices for generating low-voltage electric power (typically, at 24V) using the energy provided by a source of air under pressure are currently available on the market. Such devices basically comprise an electric generator, a radial micro-turbine coupled for rotation with the rotor of the electric generator and a nozzle through which the air under pressure provided by a source of air under pressure is directed against the blades of the micro-turbine so as to drive the micro-turbine into rotation, along with the rotor of the electric generator, thereby producing electric power from the pressure and kinetic energy of the flow of air under pressure. Such devices further comprise an electronic control unit arranged to ensure a constant output voltage independently of changes in the electric load connected to the device and in the pressure of the air under pressure supplied to the device. The arrangement of the micro-turbine in series with the electric generator makes the device rather bulky, in particular in the axial direction (i.e. in the direction of the axis of rotation of the micro-turbine and of the rotor of the electric generator).

An electric generator for an air tool is known from U.S.2005/0258694 and comprises a rotor provided with blades and an annular stator axially arranged between the rotor and a bearing for support of the rotor, wherein the rotor has, on its end face axially facing towards the stator, a plurality of cylindrical cavities which extend parallel to the axis of the rotor and accommodate each a respective permanent magnetic body (made for instance of neodymium-iron-boron) of cylindrical shape inserted into a respective non-magnetic body (made for instance of zinc, aluminium or brass) of cup-like shape. This known solution is however also affected by the drawback of the great axial size, since the stator is arranged axially at the side of the rotor. Moreover, this known electric generator has a high number of components.

A device for generating electric power from a source of air or other gas or fluid under pressure having the features set forth in the preamble of the enclosed independent claim 1 is known from U.S.2009/0224544. According to this known solution, the device comprises a plurality of permanent magnets mounted on the outer surface of a cylindrical support structure inside which the impeller of the turbine is inserted. The permanent magnets are anisotropic and have a fixed axis of magnetization, whereby they can only generate a radial magnetic field. Each pair of permanent magnets creates therefore two poles and accordingly the device will have a number of pole pairs proportional to the number of permanent magnets. Since the frequency of the electric current produced is proportional to the rotational speed and to the number of pole pairs and since a high frequency of the current may cause high hysteresis losses and high losses in the diodes of the rectifier bridge, such a known device is therefore not suitable for working at high speed.

SUMMARY OF THE INVENTION

It is therefore an object of the present invention to provide a device for generating electric power from a source of air or other gas or fluid under pressure which is small, which has a minimum number of components and which is able to work with a high rotational speed of the impeller.

This and other objects are fully achieved according to the present invention by virtue of a device for generating electric power from a source of air or other gas or fluid under pressure.

Preferred embodiments of a device for generating electric power from a source of air or other gas or fluid under pressure according to the present invention form the subject-matter of the dependent claims, the content of which is to be intended as integral and integrating part of the present description.

In short, the invention is based on the idea of providing a device for generating electric power from a source of air or other gas or fluid under pressure, comprising a stator and a rotor, wherein the stator comprises in turn a winding arrangement around a cylindrical surface and wherein the rotor is mounted inside the stator coaxially thereto and comprises in turn an impeller made as an impeller of an axial turbine and a permanent magnet made as a single hollow cylindrical body of high magnetic density material with diametrical magnetization, inside which the impeller is received. Since the impeller is received inside a permanent magnet made as a hollow cylindrical body and since the assembly formed by the impeller and by the permanent magnet is in turn received in a stator having an inner cylindrical cavity, a device is provided which has at the same time a reduced axial size and a minimum number of components. Moreover, since a single permanent magnet in the shape of a hollow cylindrical body with diametrical magnetization is used, the minimum number of pole pairs (one pole pair only) is obtained and the assembly formed by the impeller and by the permanent magnet can therefore reach high rotational speeds without incurring in the above-mentioned high losses.

Preferably, the impeller is made as an impeller of an axial impulse turbine although other kinds of turbines might be envisaged depending of the specific applications.

Preferably, the device can be provided with suitably shaped discs so as to open or close air inlet channels and to allow to adjust the air flow rate, and hence the power generated by the device.

A device for generating electric power according to the present invention allows to provide electric power with no need of supply cables and is therefore suitable for being used for instance to supply sensors or other devices in remote areas or areas which are difficult to be reached, such as areas under risk of explosion (for instance refineries), to supply wireless receiving/transmitting nodes, to supply programmable logic controllers of portable automatic unities, or again to supply low-power pneumatic valves. A further possible field of application is for instance emergency lighting: a reservoir of air under pressure with a normally-open discharge valve, which is kept closed by a supplied solenoid, in case of blackout ensures supply of air under pressure to the generator device, which can thus supply a light source (for instance high-intensity LEDs). A device for generating electric power according to the present invention can also be used to activate a display or auxiliary lights on small pneumatic or manual tools or again to supply acoustic or optical alarms for pneumatic devices.

BRIEF DESCRIPTION OF THE DRAWINGS

Further features and advantages of the present invention will become apparent from the following detailed description, given purely by way of non-limiting example with reference to the appended drawings, in which.

DETAILED DESCRIPTION OF THE PREFERRED EMBODIMENTS

In the following description and claims, the terms "axial" and "radial" are used to indicate a direction parallel and a direction perpendicular to the axis of rotation of the rotor of the electric power generator device, respectively.

Figure 1:
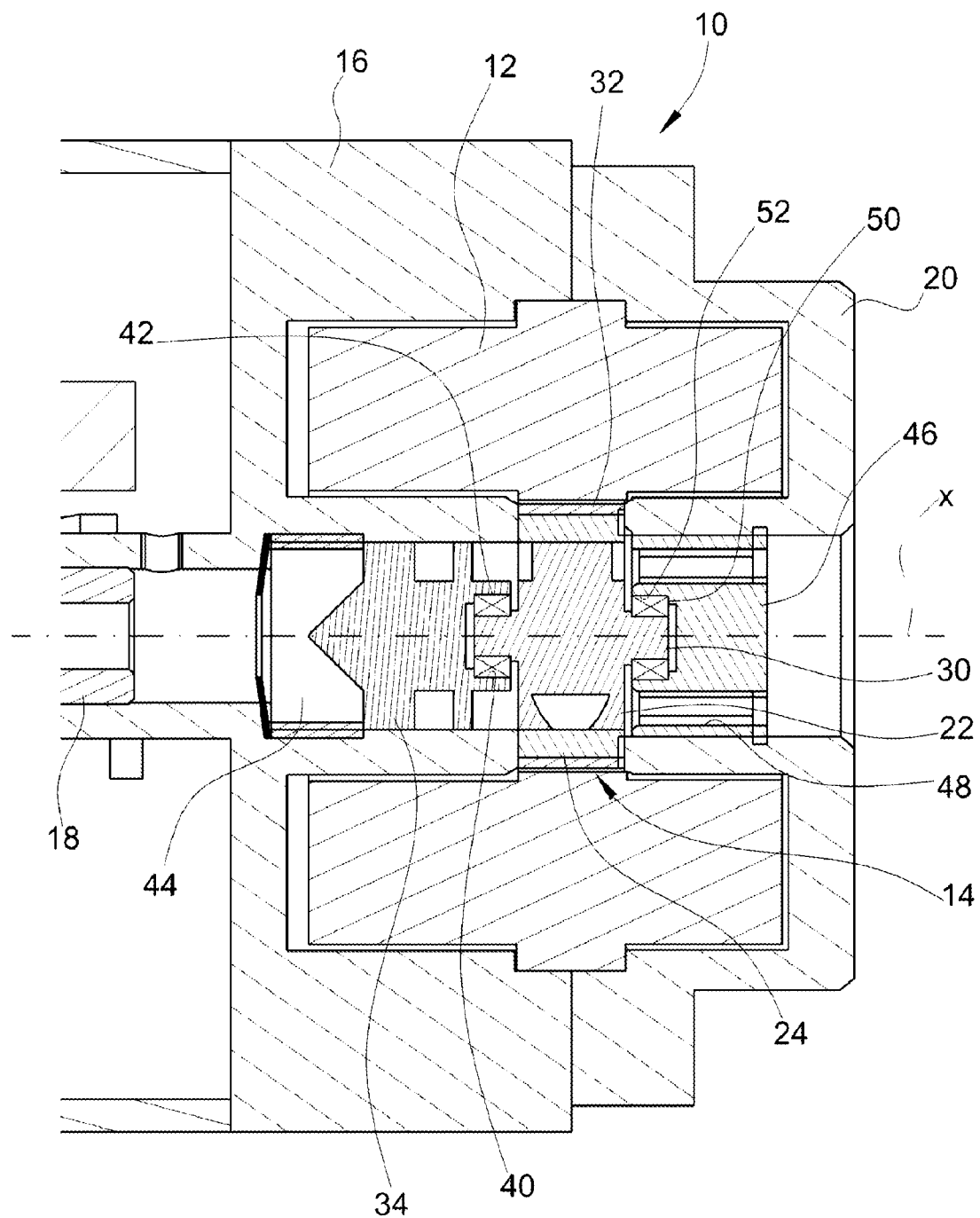
FIG. 1 is an axial section view of a device for generating electric power from a source of air under pressure according to a preferred embodiment of the present invention.

With reference to FIG. 1, a device for generating electric power (hereinafter referred to simply as "device") according to a preferred embodiment of the present invention is generally indicated 10 and basically comprises:
- a stator 12 of per-se-known type, consisting of a stator winding arrangement around a hollow cylindrical surface of axis X;
- a rotor 14 rotatably mounted inside the stator 12 coaxially thereto;
- an inlet body 16 which is arranged upstream of the assembly formed by the stator 12 and by the rotor 14 and is provided with an inlet fitting 18 (only partially shown) for connection to a source of air or other gas or fluid under pressure (not shown); and
- an outlet body 20 arranged downstream of the assembly formed by the stator 12 and by the rotor 14.

Figure 2:
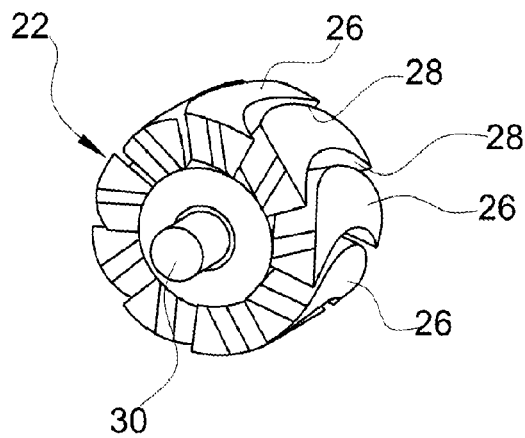
FIG. 2 is a perspective view of the impeller of the rotor of the device of FIG. 1.

The rotor 14 comprises in turn an impeller 22, which in the illustrated embodiment is made as an impeller of an axial turbine, and a permanent magnet 24, which is made as a single hollow cylindrical body inside which the impeller 22 is received. The impeller 22 and the permanent magnet 24 are rigidly connected to each other, advantageously by interference-fit, so as to rotate as a single body. The impeller 22 is made for instance of magnetic material, of non-magnetic metals or alloys or again of plastic material. The impeller 22 can be better observed in the perspective view of FIG. 2, from which in particular the shape of the blades 26 and of the channels 28 defined between them can be noticed. The impeller 22 is also provided with a shaft 30 by means of which it is rotatably mounted in the stator 12 about the axis X. The permanent magnet 24, which forms with the stator 12 an electric generator, is advantageously made of a magnetic material with high magnetic density, such as neodymium-iron-boron, samarium-cobalt or the like. The material of the permanent magnet 24 will be chosen case by case depending also on other parameters, such as for instance the temperature of use and the mechanical strength. The permanent magnet 24 is diametrically magnetized. Preferably, the rotor 14 further comprises a sleeve 32 of composite material, in particular of carbon fibre, which encloses the permanent magnet 24 and serves to increase the mechanical strength of this latter, which in use is subject both to stresses due to the centrifugal forces and to stresses due to the difference between the thermal expansion of the material of the impeller 22 and that of the material of the permanent magnet 24.

Figure 3:
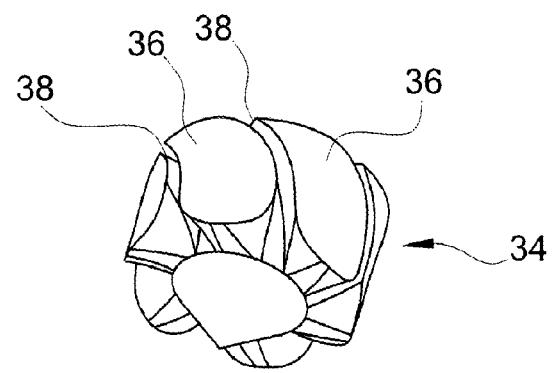
FIG. 3 is a perspective view of the distributor of the device of FIG. 1.

A distributor 34 is received in the inlet body 16, at the end axially facing towards the impeller 22, and forms with the impeller 22 an axial turbine, preferably an axial impulse turbine. The distributor 34 can be better observed in the perspective view of FIG. 3, from which in particular the shape of the blades 36 and of the channels 38 defined between them can be noticed. In the face of the distributor 34 axially facing towards the impeller 22 a cylindrical cavity 40 is provided, which receives a rolling bearing 42 (made for instance as a radial ball bearing) supporting the inlet-side end of the shaft 30 of the impeller 22. Alternatively, in case of particular conditions of use, such as very high rotational speeds, long no-stop operating times etc., other types of bearings, for instance gas bearings or magnetic bearings, may be used. A pressure balancing chamber 44 is defined by the inlet body 16 between the inlet fitting 18 and the distributor 34.

Figure 4:
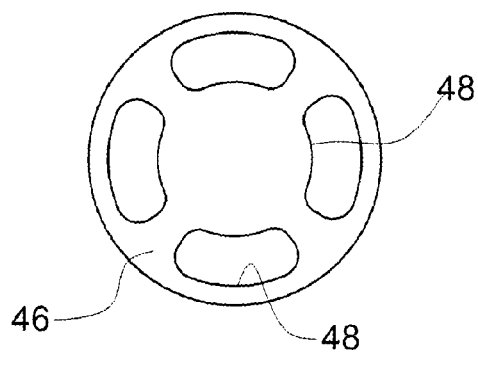
FIGS. 4 and 5 are a front elevation view and an axial section view, respectively, of the outlet disc of the device of FIG. 1.
Figure 5:
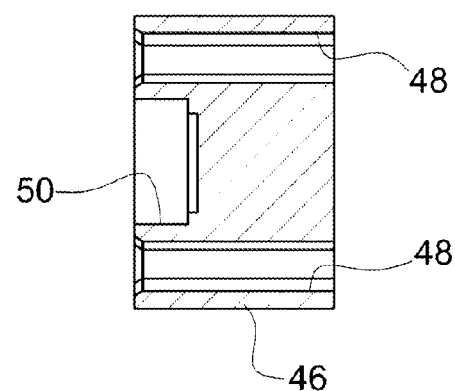

An outlet disc 46 is received in the outlet body 20 at the end axially facing towards the impeller 22 and has a plurality of openings 48 through which the air coming from the impeller 22 is discharged in the atmosphere. The outlet disc 46 is illustrated, both in axial section and in front elevation, in FIGS. 4 and 5. A cylindrical cavity 50 is provided in the face of the outlet disc 46 axially facing towards the impeller 22 and receives a rolling bearing 52 (in particular a bearing capable of withstanding both radial and axial loads, such as for instance an oblique ball bearing or one of the other types of bearings mentioned above) supporting the outlet-side end of the shaft 30 of the impeller 22. Special suitably shaped discs (not shown) can be inserted upstream of the distributor 34 to adjust the flow rate of the intake air (or other gas or fluid).

In the illustrated embodiment, the inlet body 16 and the outlet body 20 are made as separate pieces which are arranged on axially opposite sides of the stator 12 and are attached to each other (for instance by screws).

The operation of the device 10 will be briefly illustrated here below. The air under pressure produced by the source of air under pressure at a pressure comprised for instance between 2 and 4 bar, enters the pressure balancing chamber 44 of the inlet body 16 of the device 10 through the inlet fitting 18. In this connection, the pressure balancing chamber 44 serves to ensure a constant pressure upstream of the axial turbine. The air is then accelerated through the channels 38 of the distributor 34 until it reaches the sound speed at the inlet of the channels 28 of the impeller 22, enters then the impeller 22 accelerating it up to a rotational speed of 100.000÷200.000 rpm, and is finally discharged in the atmosphere through the openings 48 of the outlet disc 46. The permanent magnet 24, which is drivingly connected for rotation with the impeller 22, is thus also set into rotation and generates a rotary magnetic flux which induces electromotive forces in the stator windings of the stator 12.

The electromotive forces so induced will be rectified by a diode bridge and suitably stabilized by means of a DC-DC converter independently of changes in the supply pressure and in the load. The converter is housed in a printed circuit board, which can preferably provide auxiliary functions, such as for instance protection against overspeed or overvoltage, analog inputs for reading sensor signals, storage of the detected data, low-consumption integrated wireless module for sending the data to a remote unit etc. The converter is suitable designed to accept in input a wide range of voltages (for instance from 0 to 30 V), as the voltage which is produced changes depending on the rotational speed of the turbine, which changes in turn depending on the input pressure and on the load. This converter also serves to supply the internal electronic components. A second DC-DC converter produces an industrial voltage of 24 V from the stabilized voltage of the first converter to supply the user load (for instance a sensor).

An adjusting valve, preferably a passive valve, may be provided upstream of the device to adjust the pressure of the intake air to the optimal value for the turbine yield.

As results from the previous description, the device according to the invention has a minimum number of components, compact sizes and a high yield. In connection with this last aspect, the integration of the impeller of the turbine and of the rotor of the electric generator in a single component allows to eliminate the losses due to the mechanical coupling of these components.

Moreover, as already stated above, the use of special holed discs acting as restrictor members allows to adjust the electric power produced by the device. The device can thus be designed for applications requiring high power for a short time (for instance alarms, failure signals etc.) or for applications requiring low power for a long time (for instance sensors, monitoring devices etc.).

Naturally, the principle of the invention remaining unchanged, the embodiments and the constructional details may vary widely from those described and illustrated purely by way of non-limiting example, without thereby departing from the scope of the invention as defined in the appended claims.

For instance, although the invention has been described and illustrated with reference to a turbine made as an axial impulse turbine, the turbine might be of different type depending on the specific applications.

The invention claimed is:

1. Device for generating electric power from a source of air or other gas or fluid under pressure, comprising
    a turbine having an impeller, and
    an electric generator having a stator provided with stator windings distributed around a cylindrical surface coaxial to the impeller, and a permanent magnet which is rotatable relative to the stator and is drivingly connected for rotation with the impeller,
    wherein the impeller is housed inside the permanent magnet and wherein the assembly formed by the impeller and by the permanent magnet is housed inside the stator,
    wherein the permanent magnet is made as a single hollow cylindrical body of high magnetic density material with diametrical magnetization.

2. Device according to claim 1, wherein the turbine is an axial turbine.

3. Device according to claim 1, wherein the impeller and the permanent magnet are connected to each other by interference-fit.

4. Device according to claim 1, further comprising a sleeve enclosing the permanent magnet.

5. Device according to claim 4, wherein the sleeve is made of composite material.

6. Device according to claim 1, further comprising an inlet body arranged upstream of the impeller and provided with an inlet fitting for connection with a source of air or other gas under pressure, and an outlet body arranged downstream of the impeller, the turbine further comprising a distributor received in the inlet body and the device further comprising an outlet disc having at least one opening for discharging the air or gas in the atmosphere.

7. Device according to claim 6, wherein the distributor and the outlet disc have, on faces axially facing towards the impeller, respective cavities which accommodate bearings by which the assembly formed by the impeller and by the permanent magnet is supported for rotation.

8. Device according to claim 6, wherein the inlet body and the outlet body are made as separate pieces which are arranged on axially opposite sides of the stator and are secured to each other by a releasable connection.

* * * * *